United States Patent [19]

Giannantonio et al.

[11] Patent Number: 4,940,920

[45] Date of Patent: Jul. 10, 1990

[54] DEVICE TO SHIELD MASK CATHODE TUBES FROM THE EARTH'S MAGNETIC FIELD

[75] Inventors: Guiseppe Giannantonio, Anagni; Cesare de Paolis, Valmontone, both of Italy

[73] Assignee: Videocolor, Montrouge, France

[21] Appl. No.: 117,511

[22] Filed: Nov. 6, 1987

[30] Foreign Application Priority Data

Nov. 7, 1986 [FR] France ................................ 86 15578

[51] Int. Cl.[5] ...................... H01J 29/06; H01F 13/00; H04N 9/29

[52] U.S. Cl. ......................................... 315/8; 361/150

[58] Field of Search ....................... 315/8, 80, 85, 389, 315/397; 361/150, 151

[56] References Cited

U.S. PATENT DOCUMENTS

| | | | |
|---|---|---|---|
| 3,340,417 | 9/1967 | Panis et al. | 315/8 |
| 3,872,347 | 3/1975 | Matsushima et al. | 315/8 |
| 3,879,633 | 4/1975 | Stark, Jr. | 315/8 |
| 3,965,386 | 6/1976 | Duistermaat et al. | 315/8 |

*Primary Examiner*—Eugene R. LaRoche
*Assistant Examiner*—Ali Neyzari
*Attorney, Agent, or Firm*—Oblon, Spivak, McClelland, Maier & Neustadt

[57] ABSTRACT

To improve the trichromatic cathode tube shielding effect given by the frame-mask set and by a shielding material made with material of low magnetic permeability, the external conductors of a de-magnetization coil with two loops are made to pass in front of the fastening lugs and not behind the frit plane as was the case before, and the position of the internal conductors is set to obtain the best compromise.

3 Claims, 4 Drawing Sheets

DEVICE TO SHIELD MASK CATHODE TUBES FROM THE EARTH'S MAGNETIC FIELD

BACKGROUND OF THE INVENTION

1. Field of the Invention

The present invention pertains to a device for the protection of mask cathode tubes from the earth's magnetic field.

It is known that the earth's magnetic field affects the path of the electron beams emitted by a cathode tube gun and may cause what is called a "misregister" in a trichromatic tube, namely a discrepancy between the impact, on the screen, of the beams of the three fundamental colors and the corresponding phosphors. The amplitude of the spurious deviation depends on the amplitude of the earth's magnetic field as well as on the geometry of the tube (namely the distance between the gun and the mask, a parameter known as "p" and the distance between the mask and the envelope, a parameter known as "q").

The earth's magnetic field acts through its three components, namely the vertical component $\Delta Y$, the horizontal lateral component $\Delta X$, and the horizontal axial component $\Delta Z$. The vertical component causes a leftward spurious deviation in the Northern hemisphere while the lateral component causes a spurious deviation of the point of impact, downwards or upwards depending on whether the cathode tube is facing east or west, and the axial component causes a rotational type of deviation.

2. Description of the Prior Art

In present-day cathode tubes, to prevent the effect of the earth's magnetic field, the tubes are shielded along most of the path of the beams. The shielding is obtained by the frame-mask unit and by a drawn metal screen set in the tube and fixed on the frame, taking a substantially cone-like shape.

The shielding acts in the following way: the external magnetic field realigns the limits of the Weiss domain in the material forming the screen, creating an induced magnetic field that tends to oppose the action of the external field which has given rise to it. If the material of the screen has high magnetic permeability like, for example, mumetal, the induced field totally opposes the external field. Hence, there is no longer any disturbing field inside the shielding. If a material with low magnetic permeability is used (for example, soft steel), chosen essentially for its low cost, the compensation is no longer total. For more efficient compensation, the material of the screen has to be de-magnetized with magnetic field which is initially intense, and gradually decreases. This de-magnetization locates the magnetization curve on the so-called anhysteretic curve thus giving a more intense magnetic field opposed to the earth's field and, hence, giving better shielding. This de-magnetization is done conventionally, with a coil fixed to the rear of the tube on the cone.

The Applicant has observed that the frame-mask unit has a shielding effect with respect to the lateral and axial horizontal components and the vertical component: the effects these three components are respectively diminished by about at least 90%, 50% and 60%. The introducion of a magnetic screen made of low-permeabilty material gives, after de-magnetization, better compensation for the effects of the axial horizontal component and the vertical component (with a decrease in effect of about 87% and 97% respectively), but this result is obtained to the detriment of compensation for the lateral horizontal component, the effects of which are diminished only by about 78%. The variations in the effects of these components are simply determined by measuring the corresponding shifts in registers.

SUMMARY OF THE INVENTION

An object of the present invention is a device which can improve the shielding effect of a screen made of low-permeability magnetic material working with a cathode tube of the frame-mask type, and the improvement pertains to shielding against all three components of the earth's magnetic field at once.

A device according to the invention comprises a de-magnetization coil of the type with two oblong-shaped loops, the large sides of which are substantially horizontal, these two loops being fixed substantially on the cone of the cathode tube, symmetrically with a plane passing through the axis of the tube neck, the said loops being further connected to a de-magnetizing current generator device. According to a characteristic of the invention, the two large sides of these loops which are furthest from each other are set on the front half of the anti-implosion belt of the tube, advantageously close to the longitudinal axis of the said belt, just in front of the tube fastening lugs which are joined to this belt.

DESCRIPTION OF THE DRAWINGS

The present invention will be better understood from the following detailed description of an embodiment, taken as a non-exhaustive example and illustrated by the appended drawings of which.

DESCRIPTION OF THE PREFERRED EMBODIMENT

Figure 1:
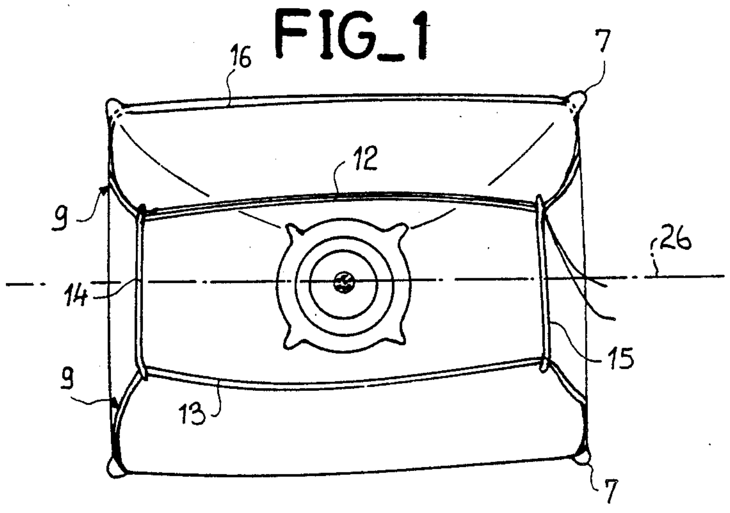
FIG. 1 is a view from behind of a cathode tube fitted with the device of the invention.
Figure 2:
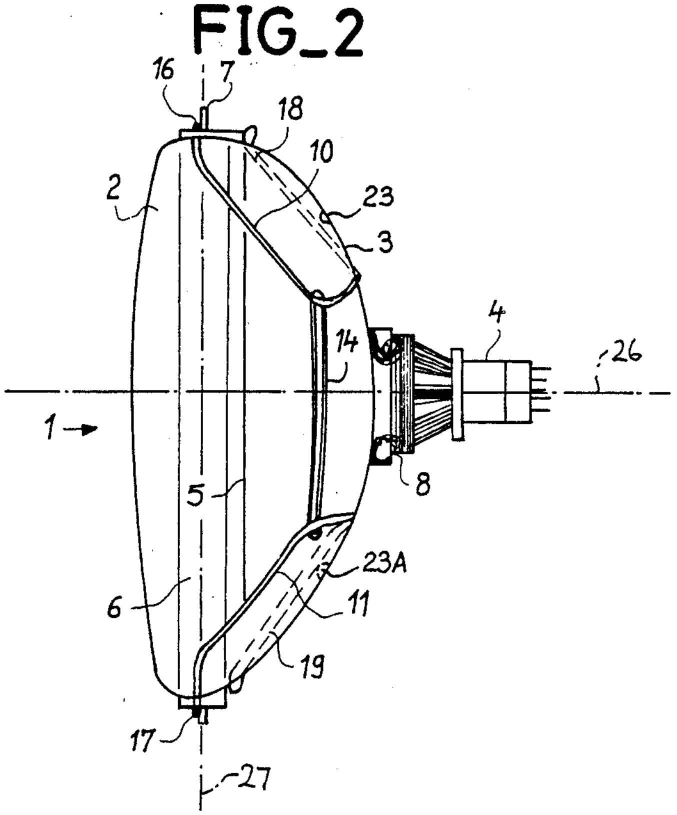
FIG. 2 is a side-face view of the tube of FIG. 1, FIGS. 3 to 6 are side-face views of the tube of FIG. 1 for various positions of the external conductors of the de-magnetization loops, the internal conductors being fixed.
Figure 3:
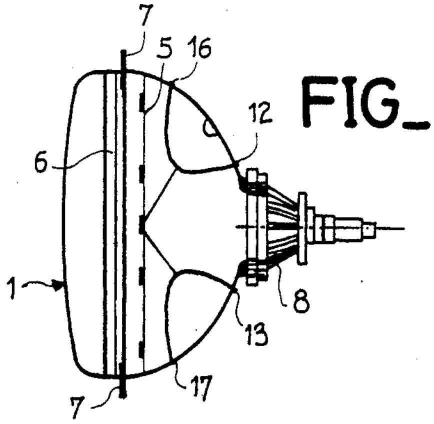
Figure 4:
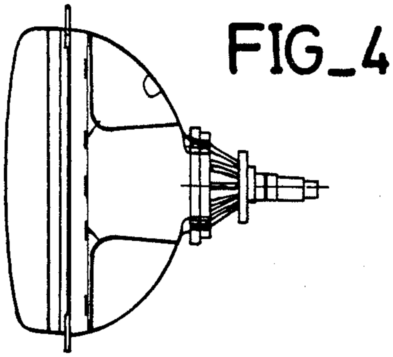
Figure 5:
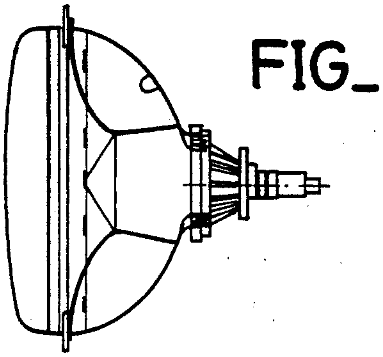

The figures shows a cathode tube 1 comprising essentially, in its glass part, a envelope 2, a cone 3, and a neck 4. FIG. 2 shows the line 5 of the "frit" plane, namely the mating face between the envelope and the cone.

An anti-implosion belt 6 clamps the skirt of the envelope 2. This belt 6 has four fastening lugs 7 near its corners. These lugs 7 are fixed approximately at mid-width on the belt 6 in a vertical plane 27. A deflecting piece 8 is fixed to the neck 4, level with the cone 3. The other details of tube 1 have not been shown because they are not necessary for an understanding of the invention.

The tube 1 has a shielding screen (not shown) inside the cone, the said screen being made of a material with low magnetic permeability, such as soft steel. This screen is de-magnetized with a de-magnetization coil 9 whenever necessary (especially when the direction of the television screen or monitor incorporating the cathode tube is changed).

Figure 12:
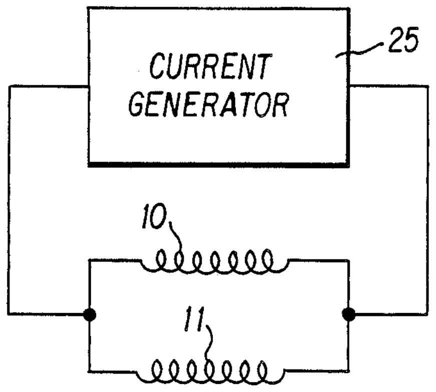
FIG. 12 is a block diagram showing the source of the current applied to the loops in FIG. 1.

The coil 9 has two identical oblong loops 10, 11, fixed by any appropriate means, for example fastening clips, to the external surface of the tube 1, with one on either side of horizontal plane 26 through the neck. These two loops are supplied in parallel by a conventional source of de-magnetizing current (shown in FIG. 12) so that their respective fields are directed towards the front of the tube 1. The corners of these loops with respect to their large sides 12, 13 closest to the neck 4 (the internal conductors of the loops) are linked in twos by holding wires 14, 15 which extend in a substantially vertical direction. The large sides, 12, 13, as well as the other two sides 16, 17, of the loops 10, 11 extend in a substantially horizontal direction. The length of the large sides 16, 17 (the external conductors of the loops) is substantially equal to the length of the large sides of the screen of the tube 1. These large sides 16, 17 are fixed to the belt 6, along the horizontal sections of the belt, and pass to the level of the lugs 7. In the present case, they are in front of the lugs 7 (for an observer looking towards the screen of the tube 1), the said lugs 7 being fixed approximately at mid-width on the belt 6. The large sides 2, 13 of the loops 10, 11, which are a little shorter (by about 1 to 2 cm.) than the large sides 16, 17, are fixed, as with the coils of the prior art, to the cone 3 close (generally a few centimeters) to the deflector 8. However, the positions of these large sides 12, 13 as well as those of the sides 16, 17, can be adjusted to the dimensions of the tubes on which the coils are fixed to obtain the optimum results as will be seen below with reference to the FIGS. 3 to 9.

The paths 18, 19 of the loops of prior art de-magnetization coils have been shown with dashes. The large external sides of these loops pass just behind the frit plane 5.

Figure 10:
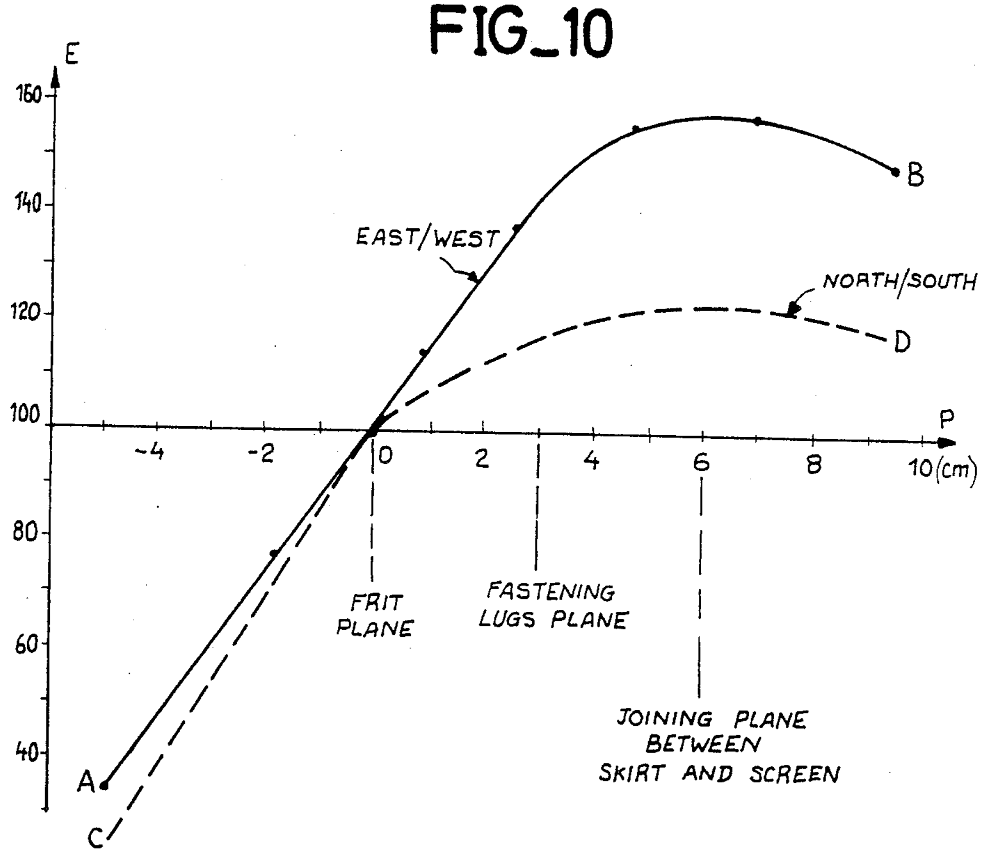

In the embodiment shown, the large sides 16, 17 of the loops 10, 11 are made to pass along the longitudinal axis of the belt 6, just before the lugs 7. However, the large sides 16, 17 can be fixed at any position located in front (for an observer looking at the screen) of the frit plane, with the results varying as shown in FIG. 10 and as explained below.

The following results were obtained by sending a de-magnetization current of the usual form and duration to the coils of the invention, with the conductors 16, 17 placed at the level of the lugs 7 and the conductors 12, 13 at mid-point between the rear side of the deflector 8 (its side closest to the tube screen) and the anode button 23 (or its symmetrical button 23A), expressing the gain in field effect, namely the residual shift of the register, in terms of a percentage: $\Delta X=42\%$, $\Delta Z=9\%$ at the corners and 22% at 6 hours and 12 hours (namely in the middle zone of the large sides of the screen), and $\Delta Y=29\%$. The said results were obtained for a non-spherical tube with a diagonal of 68 centimeters.

Figure 6:
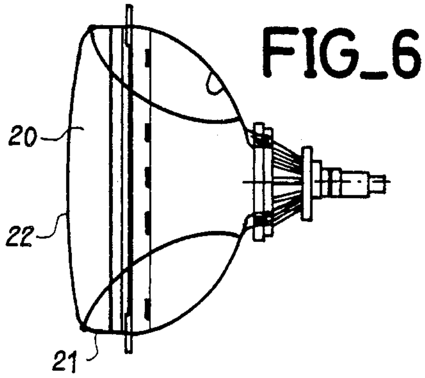
Figure 7:
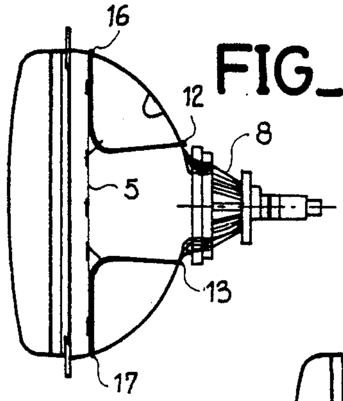
FIGS. 7 to 9 are side-face views of the tube of FIG. 1 for different positions of the internal conductors of the de-magnetization loops, the external conductors being fixed and, FIGS. 10 and 11 are graphs showing the effectiveness of the corrections obtained in the case of FIGS. 3 to 6 and 7 to 9 respectively.

To determine, in each case, the best positions of the conductors 16, 17 and 12, 13 with respect to the tube, two series of tests were conducted. In the first series, the conductors 12, 13 were kept at the level of the front face of the deflector 8 and the conductor 16, 17 was positioned at about 5 centimeters behind the frit plane (FIG. 3), at the level of the frit plane (FIG. 4), at the level of the lugs 7 (FIG. 5), and at about 6 centimeters in front of the frit plane (FIG. 6). The results obtained are shown in a graph (FIG. 10;) which shows the efficiency E of the register shift as a position of the function P of the conductor 16, 17. The efficiency obtained at the frit plane, with an X axis position P at 0 has been arbitrariliy taken to be an efficiency of 100%. The various results are marked A, B. C and D respectively for the East-West correction (the interpolated solid-line curve), and for the North-South correction (the interpolated curve drawn with dashes). It is seen that in front of the plane of the fastening lugs, the efficiency varies very little, according to the position of the conductors 16, 17, for the North-South correction and to a greater extent for the East-West correction.

Figure 9:
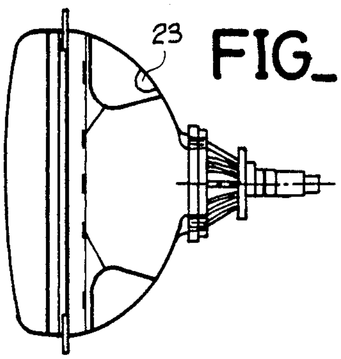
Figure 8:
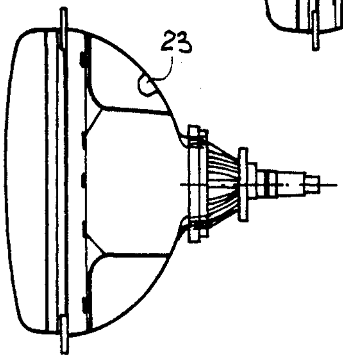
Figure 11:
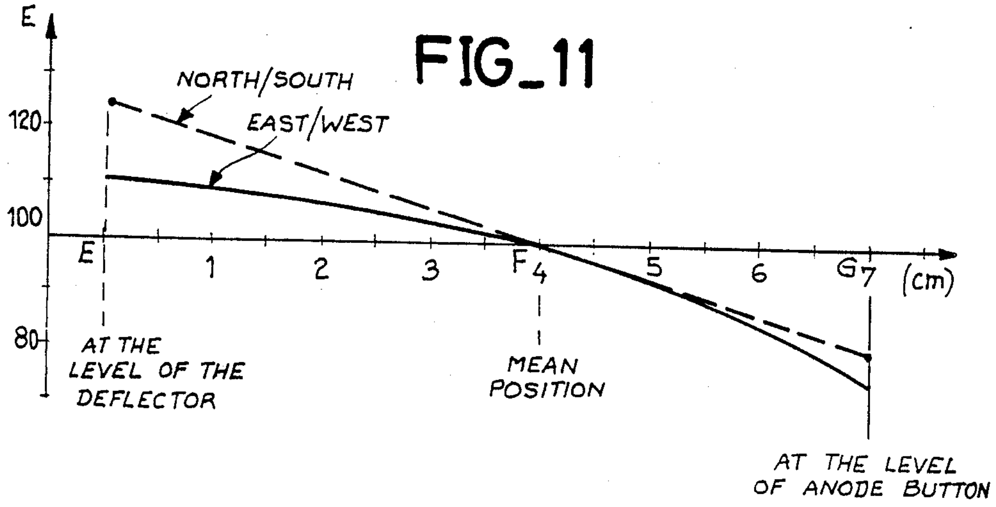

In a second series of tests, the conductors 16, 17 were fixed to the level of the frit plane, and the register shifts were measured firstly with the conductors 12, 13 positioned at the front side of the deflector 8 (FIG. 7), secondly with the conductor 12 positioned at mid-point between this position and the anode button 23 and with the conductor 13 positioned at midpoint between the said position and the symmetrical anode button 23A of the button 23 with respect to the axis of the tube 1 (FIG. 8), thirdly with the conductors 12, 13 at the level 23, 23A (FIG. 9). The results, E, F and G respectively, have been shown in the graph of FIG. 11, with a solid line for the East-West correction and with dashes for the North-South correction, the curves being drawn by making an interpolation between the results. This FIG. 11 shows the efficiency E of the correction depending on the position P of the conductors 12, 13, the efficiency of 100% being taken arbitrarily as the mean position, the X axis position 0 being taken at the front face of the deflector 8.

Of course, for the correct adjustment of the de-magnetization loop, the position of the conductors 16, 17 and that of the conductors 12, 13 must be set together. However, it must be noted that it is preferable not to bring the conductors 12, 13 too close to the deflector so as to prevent any disturbing effect of the loop on the operation of the deflector, unless means are provided to open the loop when it is not in operation.

What is claimed is:

1. A device to shield mask cathode tubes with shielding screens made of low magnetic permeability material from the earth's magnetic field, said tube having two sides which are substantially horizontal and two sides which are substantially vertical in a normal operating position, said device comprising a demagnetization coil having two oblong-shaped loops with each loop having two large sides, the large sides of which are substantially horizontal, said two loops being fixed substantially on the cone of the cathode tube, and being arranged symmetrically on opposite sides with regard to a horizontal plane passing through the axis of the tube neck, said loops being further connected to a de-magnetizing current generator device, the two large sides of these loops which are furthest from each other being located on the screen side of the frit plane of the tube and the two large sides of these loops which are closest to each other are located midway between the side of the deflector nearest the screen and an anode button.

2. A device according to claim 1, wherein said two large sides which are furthest from each other are located near the horizontal sections of an anti-implosion belt of the tube.

3. A device according to claim 2 wherein fastening lugs are fixed to the anti-implosion belt, at mid-width and wherein said two large sides which are furthest from each other pass between the fastening plane of the lugs and the mating face of the skirt with the envelope of the screen.

* * * * *